United States Patent Office 3,539,657
Patented Nov. 10, 1970

3,539,657
TWO-PHASE SILOXANE-POLYARYLENE
POLYETHER BLOCK COPOLYMERS
Allen Noshay, East Brunswick, Markus Matzner, Edison, and Charles N. Merriam, Martinsville, N.J., assignors to Union Carbide Corporation, a corporation of New York
No Drawing. Filed Mar. 21, 1968, Ser. No. 714,796
Int. Cl. C08g 47/10
U.S. Cl. 260—824                                          17 Claims

ABSTRACT OF THE DISCLOSURE

Two-phase siloxane-polyarylene polyether block copolymers having at least one siloxane chain and at least one polyarylene polyether chain each linked by a carbon to silicon bond or by an aryloxy to silicon bond, each chain having a molecular weight such that the copolymer is a two-phase polymeric material.

BACKGROUND

The invention relates to two phase organopolysiloxane-polyarylene polyether amorphous block copolymers.

Polyarylene polyethers are linear thermoplastic amorphous polymers having excellent mechanical, physical, chemical, electrical and thermal properties. In general they are characterized as stiff or rigid polymers having high tensile and flexural modulus values. For example, Bakelite (a registered trade mark) polysulfone, a commercially available polyarylene polyether has a tensile modulus (ASTM D 638) of 360,000 p.s.i. and a flexural modulus (ASTM D 790) of 390,000 p.s.i.g. Because these polymers are relatively stiff they are susceptible to environmental stress cracking, that is these polymers will fail under stress when exposed to certain environments such as certain organic solvents.

Organopolysiloxanes are well known amorphous materials having a wide variety of uses. Silicone rubbers are elastomeric materials made by cross-linking or vulcanizing siloxane gums. The cross-linking or vulcanizing step is an added step which is a drawback in many applications.

It has now been found that polyarylene polyethers are made more flexible and hence more resistant to environmental stress cracking by forming a two phase block copolymer of a siloxane and a polyarylene polyether. It has also been found that certain of these two phase block copolymers are thermoplastic elastomeric materials that can be fabricated using conventional thermoplastic molding techniques without having to be cross-linked or vulcanized.

SUMMARY

The copolymers of this invention are two phase siloxane-polyarylene polyether block compolymers comprising (A) at least one siloxane chain having at least two siloxane units represented by the formula

wherein R is a monovalent hydrocarbon group, a divalent organic group or ether group (—O—) and $b$ has a value from 1 to 3 inclusive and (B) at least one linear thermoplastic polyarylene polyether chain composed of recurring units having the formula $$—O—E—O—E'— \quad (2)$$

wherein E is the residuum of a dihydric phenol and E' is the residuum of a benzenoid compound having an inert electron withdrawing group ortho or para to the valence bond, both of said residua being valently bonded to the ether oxygens through aromatic carbon atoms. The siloxane chain and the polyarylene polyether chains are linked by a carbon bond where R is a divalent organic group or by an aryloxy to silicon bond when R is ether oxygen and each has a molecular weight such that the copolymer is a two phase polymeric material.

DESCRIPTION

Physical mixtures of an organopolysiloxane and a polyarylene polyether are incompatible. The molecular weights of the siloxane and polyarylene polyether chains in the block copolymer of this invention are such that this incompatibility is taken advantage of resulting in a polymeric copolymer having two glass transition temperatures characteristic of two phase systems. The two chains in the copolymer of this invention even though inherently incompatible are handcuffed or copolymerized together resulting in a microscopic two phase system. The two phases in the copolymer are microscopic because a film formed from the copolymer is transparent and will not reflect visible light as compared to a film formed from an incompatible physical mixture of a siloxane and a polyarylene polyether which is cloudy (translucent), will reflect visible light and has generally inferior physical properties. The physical mixture is a two phase system but the phases are macroscopic which manifests itself in a cloudy appearance as compared to the microscopic two phase copolymer of this invention which is transparent.

Under an electron microscope, the microscopic two phase nature of the copolymers of this invention can be observed and an X-ray diffraction pattern of these copolymers results in two distinct halos characteristic of two distinct amorphous phases.

Certain of the copolymers of this invention are elastomeric without having to be cured. These block copolymers have the general formulas $$(AB)_n \text{ and } A—B—A$$

wherein A represents the polyarylene polyether chain, B the siloxane chain and $n$ is an integer having a value of 1 or greater which indicates the degree of polymerization. The elastomeric behavior of the $(AB)_n$ copolymers is quite unexpected because other known block copolymers of a non-elastic polymer and an elastomeric polymer having the same general formula, such as a block copolymer of polystyrene and polybutadiene, do not exhibit elastomeric properties at the low block molecular weights of the elastomeric copolymers of this invention.

As indicated previously, the siloxane chain and the polyarylene polyether chain each has a molecular weight (1) 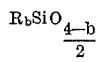

such that the copolymer is a two phase polymeric material having two glass transition temperatures. Moreover, the two glass transition temperatures are widely separated making the copolymers useful over a very wide temperature range, that is excellent properties and both high and low temperatures. The exact minimum molecular weights for each chain in the copolymer where this phenomenon occurs are somewhat difficult to determine but are believed to lie within the range of from about 1500 to about 5000. Regardless of molecular weight, a copolymer coming within the scope of this invention has two distinct phases and two distinct glass transition temperatures. Thus to prepare such a copolymer a siloxane chain having a minimum molecular weight within the range of from about 1500 to about 5000 and a maximum molecular weight of up to about 100,000 or greater and a polyarylene polyether having a minimum molecular weight within the range of from about 1500 to about 5000 and a maximum molecular weight of up to about 50,000 or greater are employed.

The two phase copolymers of this invention contain from 10 to 90 percent by weight of siloxane and from 90 to 10 percent by weight of polyarylene polyether. Two phase elastomeric copolymers contain at least 10 percent by weight siloxane and have a tensile modulus (ASTM D 638) of less than 100,000 p.s.i. and a tensile elongation (ASTM D 638) of at least 100 percent.

The preferred copolymers are linear. The preferred elastomeric copolymers contain at least 50 percent siloxane and each chain of the copolymer has a molecular weight in the range of about 5000–20,000.

As stated above the copolymers of this invention contain siloxane chains having at least two siloxane units represented by the formula:

$$R_b SiO_{\frac{4-b}{2}}$$

wherein R is a monovalent hydrocarbon group, a divalent organic group (e.g. a divalent hydrocarbon group, a hydroxy-substituted divalent hydrocarbon group or a divalent hydrocarbon group linked to a carbonyl group) or ether oxygen (—O—) and b has a value from 1 to 3 inclusive. Each divalent organic group or ether oxygen links a siloxane chain of the copolymer to a polyarylene polyether chain of the copolymer. The groups represented by R can be the same or different in any given siloxane unit or throughout the siloxane chain of the copolymers and the value of b in the various siloxane units in the siloxane chain of the copolymer can be the same or different. Each siloxane chain of the copolymer contains at least one unit represented by Formula 1 wherein at least one unit represented by R is a divalent organic group or ether oxygen.

Illustrative of the monovalent hydrocarbon groups that are represented by R in Formula 1 are the alkyl groups (for example, the methyl, ethyl, n-propyl, iso-propyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the alkenyl groups (for example, the vinyl, allyl, crotyl, 3-butenyl, 1,3-butadienyl, allenyl groups), the cycloalkenyl groups (for example, the cyclopentenyl, cyclohexenyl groups, the alkynyl groups (for example, the ethynyl, propargyl groups), the aryl groups (for example, the phenyl, naphthyl, phenanthrenyl, anthracenyl groups), the aralkyl groups (for example, the benzyl, 2-phenylethyl, 2-phenyl propyl, cumyl groups), the alkaryl groups (for example, the tolyl, t-butylphenyl, styryl, cyclohexylphenyl groups). If desired such monovalent hydrocarbon groups can contain substituent functional groups replacing one or more of the hydrogens or carbons of the monovalent hydrocarbon moiety and illustrative of such substituted monovalent hydrocarbon groups are

| | |
|---|---|
| Bromomethyl | —CH$_2$Br |
| 1-chlorovinyl | —CCl=CH$_2$ |
| 3,3,3-trifluoropropyl | —CH$_2$CH$_2$CF$_3$ |
| Pentafluoroethoxy ethyl | —CH$_2$CH$_2$OCF$_2$CF$_3$ |
| 3-chloropropyl | —CH$_2$CH$_2$CH$_2$Cl |
| 3-hydroxypropyl | —CH$_2$CH$_2$CH$_2$OH |
| 3-glycidoxypropyl | 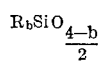 |
| 3-methacryloxypropyl | —CH$_2$CH$_2$CH$_2$O$\underset{\underset{O}{\parallel}}{C}$—$\underset{\underset{CH_3}{\vert}}{C}$=CH$_2$ |
| 3-(t-butoxy)ethyl | —CH$_2$CH$_2$OC(CH$_3$)$_3$ |
| 2-cyanoethyl | —CH$_2$CH$_2$C≡N |
| 3-cyanopropyl | —CH$_2$CH$_2$CH$_2$C≡N |
| 2-amidoethyl | —CH$_2$CH$_2$$\overset{\overset{O}{\parallel}}{C}$—NH$_2$ |
| 3-(NN-dimethyl-amido)propyl | —CH$_2$CH$_2$CH$_2$$\overset{\overset{O}{\parallel}}{C}$—N(CH$_3$)$_2$ |
| 3-aminopropyl | —CH$_2$CH$_2$CH$_2$NH$_2$ |
| 4-aminobutyl | —CH$_2$CH$_2$CH$_2$CH$_2$NH$_2$ |
| 3-isocyanatopropyl | —CH$_2$CH$_2$CH$_2$N=C=O |
| 3-carbethoxypropyl | —CH$_2$CH$_2$CH$_2$O$\overset{\overset{O}{\parallel}}{C}$CH$_2$CH$_3$ |
| 2-(p-chlorophenyl)ethyl | —CH$_2$CH$_2$—⟨phenyl⟩—Cl |
| Dibromophenyl | —⟨phenyl⟩Br$_2$ |
| p-Chloromethylphenyl | —⟨phenyl⟩—CH$_2$Cl |
| Isocyanatophenyl | —⟨phenyl⟩N=C=O |
| m-Nitrophenyl | —⟨phenyl⟩NO$_2$ |
| p-Aminophenyl | —⟨phenyl⟩—NH$_2$ |
| p-Hydroxyphenyl | —⟨phenyl⟩—OH |

The structure of the divalent organic group represented by R in Formula 1 is dependent upon the type of reaction involved in producing the siloxane-polyarylene polyether copolymer. The copolymers can be produced by any number of reactions thereby giving rise to a variety of divalent organic groups linking the siloxane chain to the polyarylene polyether chain of the copolymer. Typical of such reactions showing only the reactive groups on the siloxane and polyarylene polyether chains and the resulting link are the following:

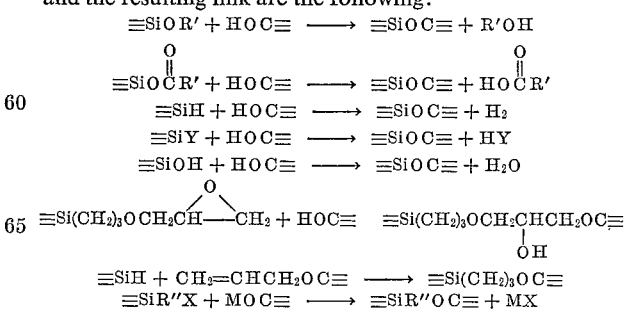

In the above equations R′ represents a monovalent alkyl or aryl group, Y represents a halogen atom or amino group, such as —NH$_2$, —NHZ, and —NZ$_2$ wherein Z is a monovalent hydrocarbon radical, x represents a halogen atom, i.e. bromine, chlorine, fluorine or iodine, M is an alkali metal such as sodium or potassium, and R″ is a divalent hydrocarbon radical, preferably a saturated aliphatic radical such as methylene, ethylene, propylene, n-butylene, isoamylene, hexamethylene and the like.

In addition, many other reactive groups can replace those shown in the above equations on either the siloxane or polyarylene polyether chains, for example on the siloxane chain:

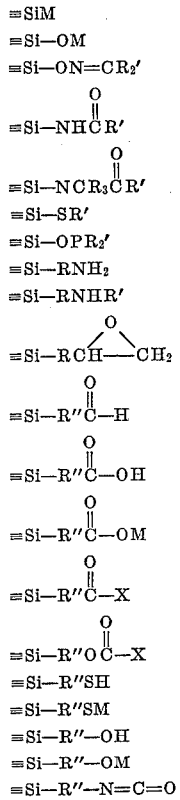

and for example on the polyarylene polyether chain;

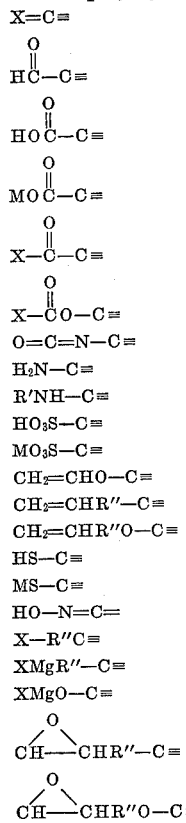

wherein R', R'', X and M are as defined previously.

Appropriately selected pairs of the foregoing reactive groups can be reacted to copolymerize the siloxane and polyarylene polyether chains.

Illustrative of the divalent hydrocarbon groups represented by R in Formula 1 are the alkylene groups (such as the methylene ethylene, propylene, butylene, 2,2-dimethyl-1,3-propylene and decylene groups), the arylene groups (such as the p-phenylene and p,p-diphenylene groups) and the alkarylene groups (such as the phenyl methylene and phenylethylene groups). Preferably, the divalent hydrocarbon groups are alkylene groups containing from two to four successive carbons, p-phenylene groups, and phenylmethylene groups. Siloxane units containing divalent hydrocarbon groups as substituents are illustrated by groups having the formulae:

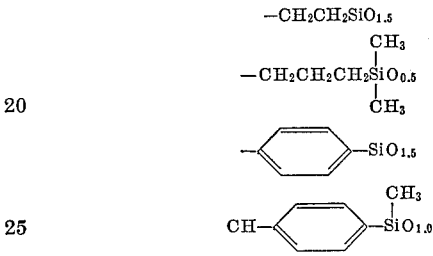

These divalent hydrocarbon groups are linked to a silicon atom of the siloxane chain of the copolymer by a silicon-to-carbon bond.

The copolymers can contain siloxane units represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenyl)siloxy, methylvinylsiloxy, bromomethyldimethylsiloxy, metaaminophenyl dimethylsiloxy and the ethylphenylvinylsiloxy groups). These copolymers can contain one or more types of siloxane units in random and/or block form that are represented by Formula 1 provided that at least one group has at least one divalent hydrocarbon substituent. By way of illustration; only p-phenylene dimethylsiloxy group

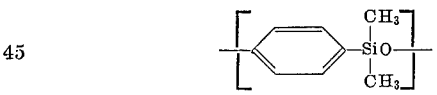

can be present in the siloxane chain or the copolymer can contain more than one type of siloxane units, e.g., the copolymer can contain both p-phenylenedimethylsiloxy units and diphenylsiloxy units, or the copolymer can contain p-phenylene dimethylsiloxy units, diphenylsiloxy units, dimethylsiloxy units, and methylvinylsiloxy units. The copolymers can contain trifunctional siloxane units (e.g., monomethylsiloxane groups, $CH_3SiO_{1.5}$), difunctional siloxane units (e.g., dimethylsiloxane units, $(CH_3)_2SiO$—), monofunctional siloxane units (e.g., bromomethyl dimethylsiloxane units, $BrCH_2(CH_3)_2SiO_{0.5}$), or combinations of these types of siloxane units having the same or different substituents. According to the average functionality of the siloxane units, the siloxane chain can be predominantly linear, cyclic, branched or crosslinked or can have combinations of these structures. Preferably the siloxane chains of the copolymers are linear or predominantly linear having small amounts of branching.

The residua E and E' in Formula (a) are characterized as stated above since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis(4-hydroxyphenyl)-propane, 1,1-bis-(4-hydroxyphenyl)-2-phenylethane, bis (4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—O—), sulfide (—S—), sulfone (—SO$_2$—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

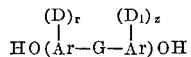

wherein Ar is an aromatic group and preferably is a phenylene group, D and D$_1$ can be the same or different inert substituent groups as alkyl groups having from 1 to 4 carbon atoms, halogen atoms, i.e., fluorine, chlorine, bromine, or iodine, or alkoxy radicals having from 1 to 4 carbon atoms, r and z are integers having a value of from 0 to 4 inclusive, and G is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane, 2,4'-dihydroxydiphenyl methane, bis-(2-hydroxyphenyl)methane, bis-(4-hydroxyphenyl)methane, bis - (4-hydroxy-2,6-dimethyl-3-methoxyphenyl)methane, 1,1 - bis(4-hydroxyphenyl)ethane, 1,2-bis-(4-hydroxyphenyl)ethane, 1,1-bis-(4-hydroxy-2-chlorophenyl)ethane, 1,1-bis(3-methyl-4-hydroxyphenyl)propane, 1,3 - bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2 - bis-(4-hydroxyphenyl)pentane, 3,3-bis(4-hydroxyphenyl)pentane, 2,2-bis-(4-hydroxyphenyl)heptane, bis - (4-hydroxyphenyl)phenylmethane, 2,2-bis-(4-hydroxyphenyl) 1-phenylpropane, 2,2-bis-(4-hydroxyphenyl) 1,1,1,3,3 - hexafluoropropane and the like;

Di(hydroxyphenyl)sulfones such as bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis - (4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-(4-hydroxy-3-isobutylphenyl)ether, bis-(4-hydroxy-3-isopropylphenyl)ether, bis - (4 - hydroxy-3-chlorophenyl)ether, bis-(4-hydroxy - 3 - fluorophenyl)ether, bis-(4-hydroxy-3-bromophenyl)ether, bis-(4-hydroxynaphthyl)ether, bis-(4-hydroxy - 3 - chloronaphthyl)ether, 4,4'-dihydroxy-3,6-dimethoxydiphenyl ether, 4,4'-dihydroxy - 2,5 - diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—SO$_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev. 49, 273 (1951) and Quart. Rev., 12, 1 (1958).

The electron withdrawing group of the dihalobenbenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a simga* value above 0.7.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine.

(b) divalent groups which can activate displacement of halogens on two different rings, such as the sulfone group —SO$_2$—; the carbonyl group —CO—; the vinyl group —CH=CH—; the sulfoxide group —SO—; the azo-group —N=N—; the saturated fluorocarbon groups —CF$_2$—CF$_2$—; organic phosphine oxides

where G is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E′ residuum of the benzenoid compounds in the polymer structure may be the same or different.

It is seen also that as used herein, the E′ term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E′ is the residuum of a dinuclear benzenoid compound. These preferred polymers then are composed of recurring units having the formula

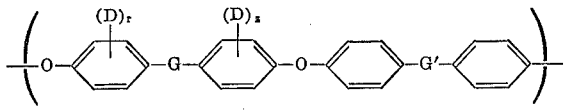

wherein G represents a member of the group consisting of a bond between aromatic carbon atoms and a divalent connecting radical and G′ represents a member of the group consisting of sulfone, carbonyl, vinyl, sulfoxide, azo, saturated fluorocarbon, organic phosphine oxide and ethylidene groups D and $D_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, G is divalent connecting radical

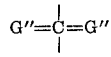

wherein G″ represents a member of the group consisting of hydrogen, lower alkyl, lower aryl, and the halogen substituted groups thereof, and G′ is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds. The preparation of a specific polyarylene polyether is detailed in Example 1 below and the one-step and two-step processes referred to above are described in detail in U.S. Pat. No. 3,264,536, issued Aug. 2, 1966.

In preparing the polyarylene polyether chains for use in this invention, the reactive groups —OM or —X, where M and X are as defined above, can be placed at each end of the polymer chain by using a molar excess of dihydric phenol in the case of —OM groups or a molar excess of dihalobenzenoid compound in the case of —X groups. These reactive groups can be reacted directly with reactive groups on the siloxane chain as indicated above or first reacted with a compound which introduces another different reactive group onto the polymer chain which can then be reacted with the reactive groups on the siloxane chain also as indicated above. The molecular weight of the polyarylene polyether chains can be controlled by varying the amounts of starting monomers.

Glass transition temperature ($T_g$) commonly referred to as the second order phase transition temperature, refers to the inflection temperatures found by plotting the resilience (recovery from one per cent elongation) of a film ranging in thickness from 3 to 15 mils against the temperature. See Brown, Textile Research Journal, 25, 891 (1955).

Reduced viscosity (RV) is determined by dissolving a 0.2 gram sample of thermoplastic polyarylene polyether in dichloromethane in a 100 ml. volumetric flask so that the resultant solution measures exactly 100 ml. at 25° C. in a constant temperature bath. The viscosity of 10 ml. of the solution which has been filtered through a sintered glass funnel is determined in viscometer at 25° C. Reduced viscosity values are obtained from the equation:

$$\text{Reduced viscosity} = \frac{t_s - t_o}{c \cdot t_o}$$

wherein:
$t_o$ is the efflux time of the pure solvent
$t_s$ is the efflux time of the polymer solution
$c$ is the concentration of the polymer solution expressed in terms of grams of polymer per 100 ml. of solution.

EXAMPLES 1–4

Polyarylene polyether general procedure

The desired amount of dihydric phenol is charged to a flask containing a solvent mixture of monochlorobenzene and dimethyl sulfoxide. The phenol is converted to the disodium salt in situ by adding the required amount of NaOH. The system is dehydrated by heating and removing the monochlorobenzene—water azeotrope. The desired amount of dihalo benzenoid compound is then added and reacted with the sodium salt of the phenol at about 140° C. The polymer is recovered by precipitating, filtering, washing and drying. The molecular weight of the polymer is controlled by the amounts of monomers used and to produce a hydroxy terminated polymer a molar excess of phenol is employed and, for a halo terminated polymer, a molar excess of benzenoid compound. Where an excess of phenol is used, the polymer is treated with acid, such as oxalic, hydrochloric and citric acids, HCl to convert the terminal —ONa group to —OH groups.

Block copolymer general procedure

A four-neck, 500 ml. flask is fitted with a mechanical stirrer, a reflux condenser, a nitrogen inlet and stopcock. After heating to dry the apparatus and flushing with dry nitrogen, the desired amount of hydroxy or halo terminated polyarylene polyether is charged to the flask with a sufficient suitable solvent to dissolve the polymer. Suitable solvents include tetrahydrofuran, chlorobenzene, and the like. A portion of the solvent is then distilled out to remove any traces of moisture. While refluxing, the desired amount of polysiloxane having terminal groups capable of reacting with the terminal groups of the polyarylene polyether is added slowly. The block copolymer is isolated by removing the solvent by suitable techniques such as flash distillation under vacuum, coagulation and the like. Polymers of the $(AB)_n$ type, wherein A represents the polyarylene polyether chain and B the siloxane chain are made using substantially equimolar amounts of A and B. An A—B—A type polymer is made using two moles of A for each mole of B. Conversely, a B—A—B type polymer is made using two moles of B for each mole of A.

In these examples, —OH terminated polyarylene polyether is prepared following the general procedure from a molar excess 2,2′-bis(4-hydroxyphenyl)propane, also known as bisphenol A, and 4,4′-dichlorodiphenyl sulfone and has the repeating unit

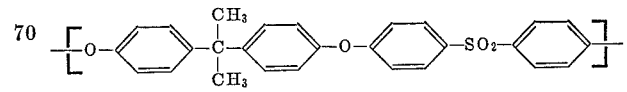

Block copolymers are prepared following the general procedure. Examples using bis(dimethylamine) terminated polydimethylsiloxane are summarized in the following table:

| Example No. | Polyarylene polyether molecular weight | Polysiloxane molecular weight | Percent siloxane in copolymer | RV of copolymer * | Tensile modulus, p.s.i. | Tensile strength, p.s.i. | Percent elongation | $T_g$'s | |
|---|---|---|---|---|---|---|---|---|---|
| 1 | 9,300 | 4,900 | 40.5 | 0.40 | 29,000 | 2,700 | 150 | −110 | +175 |
| 2 | 4,700 | 5,100 | 57.3 | 0.83 | 20,000 | 2,400 | 350 | −100 | +175 |
| 3 | 4,600 | 7,500 | 66.9 | 0.64 | 900 | 1,300 | 300 | ∼−100 | +175 |
| 4 | 4,700 | 9,800 | 73.1 | 0.61 | 100 | 600 | 350 | ∼−100 | +180 |

* RV of copolymer determined at 0.2 g./dl. in dichloromethane of 25° C.

Each of the block copolymers in the above examples is of the $(AB)_n$ type, shows a two-phase nature under an electron microscope, has two $T_g$'s and each is a thermoplastic elastomer without having to be cured to obtain optimum properties.

The environmental stability of the copolymer of Example 2 is measured by its retention of its initial RV after exposure as follows:

| Environment | Temp., ° C. | Percent retention of initial RV after 2 months |
|---|---|---|
| Water | 23 | 97 |
| Do | 60 | 83 |
| Do | 100 | 49 |
| 10% NaOH | 23 | 100 |
| 10% HCl | 23 | 46 |
| ASTM Oils No. 1, 2 & 3 | 23 | 89 |
| Air | 150 | 87 |
| Do | 170 | [1] 68 |

[1] 28 days.

EXAMPLE 5

Following the polyarylene polyether general procedure, a hydroxyl terminated polymer having a molecular weight of ∼10,000 is prepared from 4,4'-dichlorodiphenyl sulfone and a molar excess of bisphenol A. A block copolymer of the A–B–A type and containing 33 percent by weight siloxane is prepared following the general procedure using bis(dimethylamine) terminated polydimethylsiloxane having a molecular weight of 10,000. The block copolymer is a two-phase material having two $T_g$'s.

EXAMPLE 6

Following the polyarylene polyether general procedure, a hydroxyl terminated polymer having a molecular weight of 10,000 is prepared from 4,4'-dichlorodiphenyl sulfone and a molar excess of bisphenol A. A block copolymer of the B–A–B type and containing 66 percent by weight siloxane is prepared following the general procedure using bis(dimethylamine) terminated polydimethylsiloxane having a molecular weight of 10,000. The block copolymer is a two-phase material having two $T_g$'s.

EXAMPLE 7

Following the polyarylene polyether general procedure, a hydroxyl terminated polymer having a molecular weight of 5000 is prepared from 4,4'-dichlorodiphenyl sulfone and a molar excess of 4,4'-dihydroxydiphenyl sulfone. A block copolymer of the $(AB)_n$ type and containing 50 percent by weight siloxane is prepared following the general procedure using bis(dimethylamine) terminated polydimethylsiloxane having a molecular weight of 5000. The block copolymer is a two-phase material having two $T_g$'s.

EXAMPLE 8

Following the polyarylene polyether general procedure, a chlorine terminated polymer having a molecular weight of 12,000 is prepared from the 4,4'-bisphenol of benzophenone and a molar excess of 4,4'-dichlorodiphenyl sulfone. A block copolymer of the A–B–A type and containing 33 percent by weight siloxane is prepared following the general procedure using a bis mercaptoalkyl-terminated polymethylphenyl siloxane having a molecular weight of 12,000. The block copolymer is a two-phase material having two $T_g$'s.

EXAMPLE 9

Following the polyarylene polyether general procedure, a hydroxyl terminated polymer having a molecular weight of 7,500 is prepared from 4,4'-dichlorodiphenyl sulfone and a molar excess of the 4,4'-bisphenol of vinyl cyclohexene (prepared by an acid catalyzed condensation of 2 moles of phenol with one mole of vinyl cyclohexene). A block copolymer of the $(AB)_n$ type and containing 50 percent by weight siloxane is prepared following the general procedure using a bis bromolkyl-terminated polydiphenyl siloxane having a molecular weight of 7,500. The block copolymer is a two-phase material having two $T_g$'s.

EXAMPLE 10

Following the polyarylene polyether general procedure, a fluorine terminated polymer having a molecular weight of 20,000 is prepared from bisphenol A and a molar excess of 4,4'-difluorobenzophenone. A block copolymer of the $(AB)_n$ type and containing 20 percent by weight siloxane is prepared following the general procedure using a bis(alkali metal silanolate) terminated poly(dimethyl siloxane) having a molecular weight of 5000. The block copolymer is a two-phase material having two $T_g$'s.

EXAMPLE 11

Following the polyarylene polyether general procedure, a hydroxyl terminated polymer having a molecular weight of 5000 is prepared from 4,4-difluorodiphenylbenzophenone and a molar excess of hydroquinone. A block copolymer of the A—B—A type and containing 80 percent by weight siloxane is prepared following the general procedure using bis(dimethylamine) terminated poly(dimethyl siloxane) having a molecular weight of 40,000. The block copolymer is a two-phase material having two $T_g$'s.

EXAMPLE 12

Following the polyarylene polyether general procedure, a chlorine terminated polymer having a molecular weight of 45,000 is prepared from bisphenol A and a molar excess of 2,5-dichloronitrobenzene. A block copolymer of the A—B—A type and containing 10 percent by weight siloxane is prepared following the general procedure using a bis amino alkyl terminated polydimethyl siloxane having a molecular weight of 10,000. The block copolymer is a two-phase material having two $T_g$'s.

EXAMPLE 13

Following the polyarylene polyether general procedure, a hydroxyl terminated polymer having a molecular weight of 5,000 is prepared from 4,4'-dichloroazobenzene and a molar excess of resorcinol. A block copolymer of the $(AB)_n$ type and containing 50 percent by weight siloxane is prepared following the general procedure using bis(isocyanatopropyl) terminated copolymer containing 97% dimethyl siloxane units and 3% vinylmethyl siloxane units having a molecular weight of 5000. The block copolymer is a two-phase material having two $T_g$'s. The environmental resistance, especially under stress, to solvents, elevated temperatures and the like, of the copolymers of this example, as well as other copolymers of this invention, is greatly enhanced by crosslinking through the vinyl groups by any of several well known methods, for example, peroxide, irradiation and the like. The block copolymers are useful per se for the formation of injection moldings, compression moldings, extrusions, film and spray coatings, sealants and adhesives. They can also be used to form latices from which foam or dipped goods may be prepared and in cmpositions with other polymers. Certain compositions also display excellent abrasion resistance. Crosslinked block copolymers having good environmental resistance are especially useful in moldings and extrusions and especially in wire and cable insulation.

The polyarylene polyethers used in Examples 7–13 are composed of recurring units having the formulas:

Example 7:

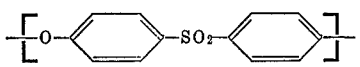

Example 8:

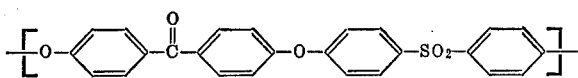

Example 9:

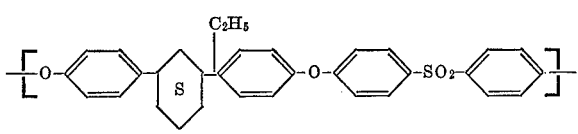

Example 10:

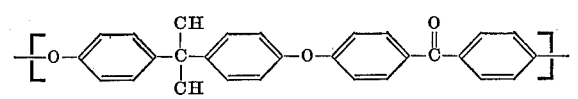

Example 11:

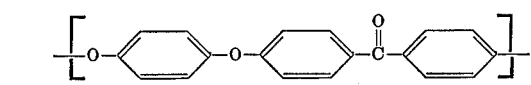

Example 12:

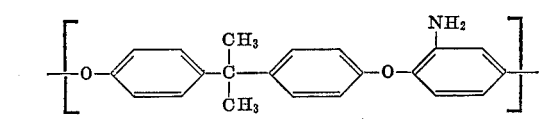

Example 13:

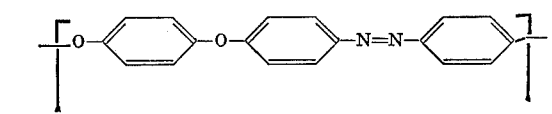

What is claimed is:

1. Two-phase siloxane-polyarylene polyether block copolymer comprising (A) at least one siloxane chain having at least two siloxane units represented by the formula:

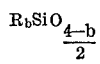

wherein R is a monovalent hydrocarbon group, a substituted monovalent hydrocarbon group wherein each substituent is a halogen atom, an oxygen atom of an epoxy group or a hydroxy cyano, alkoxy, amino, amido, isocyanato, nitro, or ester group, a divalent organic group or ether oxygen (—O—) and $b$ has a value from 1 to 3 inclusive, said siloxane chain containing at least one of said siloxane units wherein at least one R is a divalent organic group or ether oxygen which links the siloxane chain to a polyarylene polyether chain by a carbon to silicon bond when R is a divalent organic group or by an aryloxy to silicon bond when R is ether oxygen, and (B) at least one linear thermoplastic polyarylene polyether chain composed of recurring units having the formula

wherein E is the residuum of a dihydric phenol and E' is the residuum of a benzenoid compound having an inert electron withdrawing group having a sigma* value above about +0.7 ortho or para to the valence bonds, both of said residua being valently bonded to the ether oxygens through aromatic carbon atoms, said siloxane chain and said polyarylene polyether chain each having a molecular weight such that the copolymer is a two phase polymeric material.

2. Copolymer of claim 1 wherein said siloxane is linear.

3. Copolymer of claim 1 wherein siloxane is present in an amount of at least about 10 percent and said copolymer is an elastomeric material.

4. Copolymer of claim 1 wherein said polyarylene polyether chain is composed of recurring units having the formula

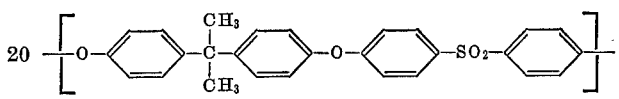

5. Copolymer of claim 4 wherein said siloxane is linear and said copolymer is of the $(AB)_n$ type wherein A represents said polyarylene polyether chain, B represents said siloxane chain and $n$ is an integer having a value of 1 or greater.

6. Copolymer of claim 4 wherein said siloxane is linear and said copolymer is of the A—B—A type wherein A represents said polyarylene polyether chain and B represents said siloxane chain.

7. Copolymer of claim 1 wherein said polyarylene polyether chain is composed of recurring units having the formula

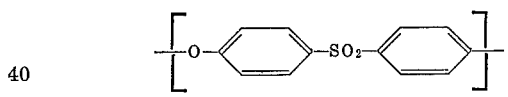

8. Copolymer of claim 1 wherein said siloxane chain is polydimethylsiloxane.

9. Copolymer of claim 1 wherein said siloxane chain contains at least 1 mole percent of olefinic unsaturation.

10. The crosslinked copolymer of claim 9.

11. Process for preparing the two-phase siloxane-polyarylene polyether block copolymer of claim 1 wherein R is ether oxygen which comprises reacting an amine terminated siloxane chain and a hydroxyl terminated linear thermoplastic polyarylene polyether chain composed of recurring units having the formula

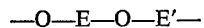

wherein E is the residuum of a dihydric phenol and E' is the residuum of a benzenoid compound having an inert electron withdrawing group having a sigma* value above about +0.7 ortho or para to the valence bonds, both of said residua being valently bonded to the ether oxygens through aromatic carbon atoms, said siloxane chain and said polyarylene polyether chain each having a molecular weight such that the copolymer is a two-phase polymeric material.

12. Process of claim 11 wherein said siloxane is linear.

13. A copolymer as claimed in claim 1 wherein at least one group represented by R is a substituted monovalent hydrocarbon group wherein each substituent is a halogen atom.

14. A copolymer as claimed in claim 1 wherein at least one group represented by R is a 3,3,3-trifluoropropyl group.

15. A copolymer as claimed in claim 1 wherein each group represented by R is a monovalent hydrocarbon group, a divalent organic group or ether oxygen.

16. The copolymer of claim 1 wherein said siloxane chain and said polyarylene polyether chain each have a molecular weight in excess of 1,500.

17. The copolymer of claim 1 wherein said siloxane chain and said polyarylene polyether chain each have a molecular weight in excess of 5,000.

References Cited

UNITED STATES PATENTS

| | | | |
|---|---|---|---|
| 3,063,872 | 11/1962 | Boldebuck | 260—824 |
| 3,402,143 | 9/1968 | Hay | 260—824 |
| 3,417,053 | 12/1968 | Chalk | 260—824 |
| 3,423,479 | 1/1969 | Hendricks | 260—824 |
| 3,384,599 | 5/1968 | Omietanski et al. | 260—824 |

SAMUEL H. BLECH, Primary Examiner

U.S. Cl. X.R.

260—2.5, 29.6, 47, 49